(12) United States Patent  
Ishida et al.

(10) Patent No.: US 8,345,814 B2  
(45) Date of Patent: Jan. 1, 2013

(54) JET PUMP AND NUCLEAR REACTOR

(75) Inventors: Naoyuki Ishida, Hitachi (JP);  
Hisamichi Inoue, Takahagi (JP)

(73) Assignee: Hitachi, Ltd., Tokyo (JP)

( * ) Notice: Subject to any disclaimer, the term of this patent is extended or adjusted under 35 U.S.C. 154(b) by 570 days.

(21) Appl. No.: 12/350,254

(22) Filed: Jan. 8, 2009

(65) Prior Publication Data

US 2009/0252276 A1     Oct. 8, 2009

(30) Foreign Application Priority Data

Jan. 8, 2008   (JP) ................................. 2008-001077

(51) Int. Cl.  
*G21C 19/28*     (2006.01)

(52) U.S. Cl. ....................................... 376/372; 376/361

(58) Field of Classification Search .................. 376/372, 376/361; 417/151  
See application file for complete search history.

(56) References Cited

U.S. PATENT DOCUMENTS

| | | | | |
|---|---|---|---|---|
| 3,389,055 A | * | 6/1968 | Hughes | 376/407 |
| 3,607,635 A | * | 9/1971 | Ripley et al. | 376/372 |
| 3,625,820 A | | 12/1971 | Gluntz et al. | |
| 4,580,948 A | * | 4/1986 | Schmidlin | 417/54 |
| 4,847,043 A | * | 7/1989 | Gluntz | 376/372 |

FOREIGN PATENT DOCUMENTS

| | | |
|---|---|---|
| JP | 45-035945 | 11/1970 |
| JP | 52-067898 | 5/1977 |
| JP | 54-057296 | 4/1979 |
| JP | 2001-090700 | 4/2001 |
| JP | 2002-089499 | 3/2002 |

* cited by examiner

*Primary Examiner* — Ricardo Palabrica  
(74) *Attorney, Agent, or Firm* — Antonelli, Terry, Stout & Kraus, LLP.

(57) ABSTRACT

A jet pump comprising:
 a nozzle apparatus having a header portion including, inside, a first pipe member forming a suction fluid passage for introducing suction fluid and the header portion surrounding the first pipe member, for introducing driving fluid, and a nozzle portion connected to the header portion, surrounding the first pipe member and forming an annular ejection outlet for ejecting the driving fluid;
 a jet pump body for mixing the driving fluid and the suction fluid sucked by the ejection of the driving fluid, and discharging the mixed fluid; and
 a second pipe member having one end connected to the nozzle apparatus, for introducing the driving fluid to the header portion,
 wherein the first pipe member is disposed through the one end inside a driving fluid passage formed in the second pipe member, and forms an opening portion of the suction fluid passage opened to the outside of the second pipe member; and
 the driving fluid passage is formed so that the driving fluid flowing toward the one end hits the first pipe member diagonally to the axial direction of the first pipe member.

14 Claims, 8 Drawing Sheets ns="http://www.w3.org/1999/xhtml"># JET PUMP AND NUCLEAR REACTOR

CLAIM OF PRIORITY

The present application claims priority from Japanese Patent application serial no. 2008-001077, filed on Jan. 8, 2008, the content of which is hereby incorporated by reference into this application.

BACKGROUND OF THE INVENTION

The present invention relates to jet pump and reactor and more particularly, to a jet pump and a nuclear reactor suitable for application in a boiling water reactor.

A conventional boiling water reactor (BWR) has a jet pump installed in its reactor pressure vessel. The jet pump has a nozzle, a bell mouth, a throat, and a diffuser. A recirculation pipe is connected to the reactor pressure vessel. Cooling water pressurized by operation of a recirculation pump provided on the recirculation pipe, passes through the recirculation pipe and is ejected from the nozzle into the jet pump as a driving flow. The nozzle increases the speed of the driving flow. The ejected driving flow causes the cooling water present around the nozzle to flow into the throat as a suction flow. The cooling water discharged from the diffuser is supplied to a core through a lower plenum (for example, see U.S. Pat. No. 3,625,820).

A jet pump disclosed in Japanese Patent Laid-open No. 2002-89499 has a suction pipe for sucking a conveying object (rainwater, wastewater flowed into a grit pound, solid matter, etc.) and an annular member surrounding the suction pipe. In addition, this jet pump forms a high-pressure water feed chamber between the suction pipe and the annular member, provided around the suction pipe. A plurality of water injection openings opened to the high-pressure water feed chamber are disposed around the suction pipe. High-pressure water supplied into the high-pressure water feed chamber is jetted from those injection openings to suck the conveying object into the suction pipe.

The jet pump disclosed in FIG. 3 of Japanese Patent Laid-open No. 2001-90700 has a venturi pipe and a nozzle for ejecting a driving flow to the upper course of the venturi pipe. This nozzle has an inner cylinder and an outer cylinder surrounding the inner cylinder. A driving flow passage formed between the inner cylinder and the outer cylinder is an annular passage for the driving flow, the cross section of which passage gradually diminishes toward the discharging side of the driving flow. The driving flow supplied to the driving flow passage is ejected from one end of the passage (a discharge outlet) into the venturi pipe. Washing water present around the nozzle is sucked into the venturi pipe due to the driving flow ejected from the nozzle. To be more precise, this washing water flows into the venturi pipe through each of a first coolant suction passage formed between the nozzle and the venturi pipe and a second coolant suction passage formed inside the inner cylinder. The driving flow in a cylindrical form is ejected from the nozzle. The cross sections of the driving flow in a cylindrical form look like continuous rings.

SUMMARY OF THE INVENTION

Performance of a jet pump can be indicated by the M ratio, N ratio and efficiency as shown below. M ratio is the ratio of a flow rate Qs of the suction flow (cooling water) flowed into a throat portion, to a flow rate Qn of the driving flow (recirculating water) at a nozzle portion, represented as in an equation (1).

$$M \text{ ratio} = Qs/Qn \quad (1)$$

N ratio is the total pressure ratio of the suction flow to the driving flow, represented as in an equation (2).

$$N \text{ ratio} = (Pd-Ps)/(Pn-Pd) \quad (2)$$

Here, Pd is the total pressure of a diffuser portion, Ps is the total pressure of the throat portion, and Pn is the total pressure of the nozzle portion. Efficiency $\eta$ is the ratio of energy of the suction flow to the driving flow, represented as a product of the M ratio and the N ratio.

$$\eta = M \text{ ratio} \times N \text{ ratio} \quad (3)$$

It is preferable for a jet pump to have a larger M ratio, N ratio and efficiency $\eta$. If the flow rate of the cooling water discharged from the jet pump could be efficiently increased using a recirculation pump of small capacity, the recirculation system can be downsized and installation space for the recirculation system can be reduced.

For example, when a power uprate in an existing nuclear reactor (BWR, for example) is to be implemented, the reactor power can be increased by increasing the core flow to enhance the cooling capability of the core. In addition, since expanding the control range of the core flow rate increases the range of void fraction change in the core, the economical efficiency of fuel can be improved. In order to increase the core flow rate, the recirculation pump, the feed water pump, and the jet pump may be modified. The inventors have found out that modification of the jet pump was more effective than reconstruction or replacement of large equipment such as the recirculation pump and the feed water pump, for the reconstruction of the existing reactor for the power uprate. Since performance of the jet pump heavily depends on the shape of the mixing part for mixing the driving flow and the suction flow, the performance may be improved by modifying the nozzle for ejecting the driving flow.

The jet pump disclosed in Japanese Patent Laid-open No. 2002-89499, which has the suction pipe for sucking a conveying object, and the annular member surrounding the suction pipe to supply a driving flow inside, cannot be used as a jet pump of the nuclear reactor to supply coolant to the core. If the jet pump disclosed in the patent document is installed in a downcomer, which is an open area inside the reactor pressure vessel, pressure loss at the suction portion will be too large to increase the M ratio. If the diameter of the suction pipe is made larger to reduce the pressure loss at the suction portion and also to increase the M ratio, the high-pressure water feed chamber that is the annular portion, will be large, causing the jet pump to be uninstallable in the small downcomer area above a set of two jet pumps in a current BWR.

The jet pump disclosed in FIG. 3 of Japanese Patent Laid-open No. 2001-90700 flows a suction flow present around the nozzle into the venturi pipe through each of the first coolant suction passage and the second coolant suction passage by ejecting a driving flow from the nozzle. By using the nozzle disclosed in Japanese Patent Laid-open No. 2001-90700 in the jet pump disclosed in U.S. Pat. No. 3,625,820, the efficiency of the jet pump can be increased.

However, in the jet pump disclosed in FIG. 3 of Japanese Patent Laid-open No. 2001-90700, the driving flow is supplied to the driving flow passage formed between the inner cylinder and the outer cylinder, from the side at a right angle through a driving flow feeding pipe. Because of this, the driving flow flowing into the driving flow passage hits the inner cylinder from the side and turns downward at a right angle, causing great pressure loss and applies large forces to the connection part between the nozzle and the driving flow feeding pipe connected to the nozzle. The connection part between the nozzle and the driving flow feeding pipe needs to be strengthened. In addition, a jet pump disposed in the reactor pressure vessel of a BWR has an inverted U-shaped elbow pipe, a nozzle, and a throat portion joined as a single detachable unit. A raiser pipe connected to the elbow pipe is fixed to a core shroud surrounding the core and disposed in the reactor pressure vessel. In order to install the nozzle having the inner cylinder and the outer cylinder, the raiser pipe and a nozzle fixture need to be modified.

To increase the degree of the power uprate of the reactor, further improvement in the efficiency of the jet pump is expected.

An object of the present invention is to provide a jet pump and a nuclear reactor which can further increase efficiency of the jet pump.

A feature of the present invention for achieving the above object is that a nozzle apparatus having a header portion including, inside, a first pipe member forming a suction fluid passage for introducing suction fluid and the header portion surrounding the first pipe member, for introducing driving fluid, and a nozzle portion connected to the header portion, surrounding the first pipe member and forming an annular ejection outlet for ejecting the driving fluid; and a second pipe member having one end connected to the nozzle apparatus, for introducing the driving fluid to the header portion are comprised, wherein the first pipe member is disposed through the one end inside a driving fluid passage formed in the second pipe member, and forms an opening portion of the suction fluid passage opened to the outside of the second pipe member; and the driving fluid passage is formed so that the driving fluid flowing toward the one end hits the first pipe member diagonally to the axial direction of the first pipe member.

Since the driving fluid passage formed inside the second pipe member is formed so that the driving fluid flowing toward the one end hits the first pipe member diagonally to the axial direction of the first pipe member, pressure loss inside the driving fluid passage is decreased. Since the speed of the driving fluid ejected from the annular ejection outlet of the nozzle portion becomes faster, the flow rate of the suction fluid sucked inside the jet pump body is increased. From above, efficiency of the jet pump is improved.

The above object can also be achieved by a feature that a nozzle apparatus having aheader portion including, inside, a first pipe member forming a suction fluid passage for introducing suction fluid and the header portion surrounding the first pipe member, for introducing driving fluid, and a nozzle portion connected to the header portion, surrounding the first pipe member and forming an annular ejection outlet for ejecting the driving fluid; and an inverted U-shaped second pipe member having one end connected to the nozzle apparatus, for introducing the driving fluid to the header portion are comprised, wherein the first pipe member extending to the axial direction of the nozzle apparatus is disposed through the one end inside a driving fluid passage formed in the second pipe member, and forms an opening portion of the suction fluid passage opened to the outside of the second pipe member; and a fixing position of the first pipe member to the second pipe member is disposed lower than the top point of the outer surface of the second pipe member.

According to the present invention, efficiency of the jet pump can be further increased.

DETAILED DESCRIPTION OF THE PREFERRED EMBODIMENTS

Various embodiments of the present invention are described below using figures.

First Embodiment

Figure 3:
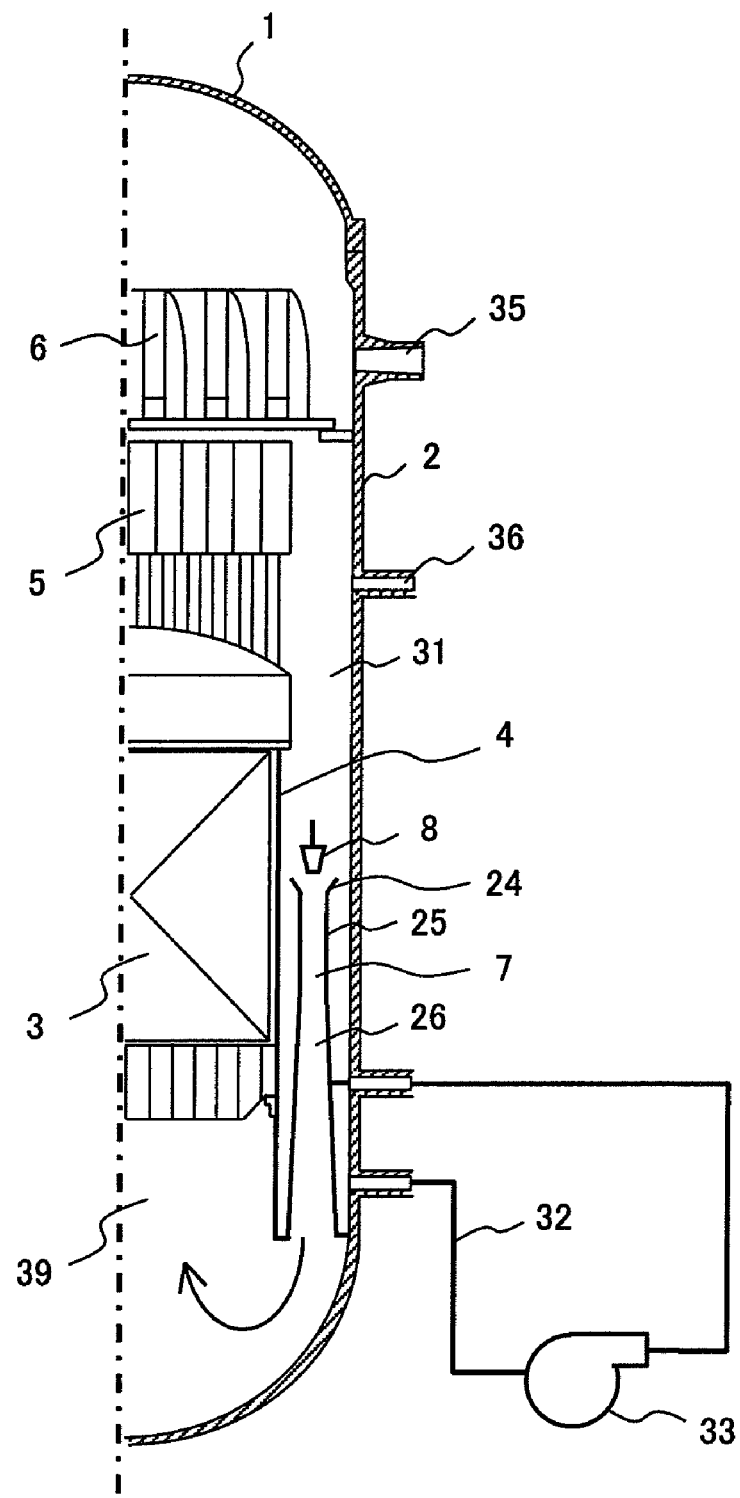
FIG. 3 is a longitudinal sectional view showing a boiling water reactor to which the jet pump of the first embodiment is applied.
Figure 4:
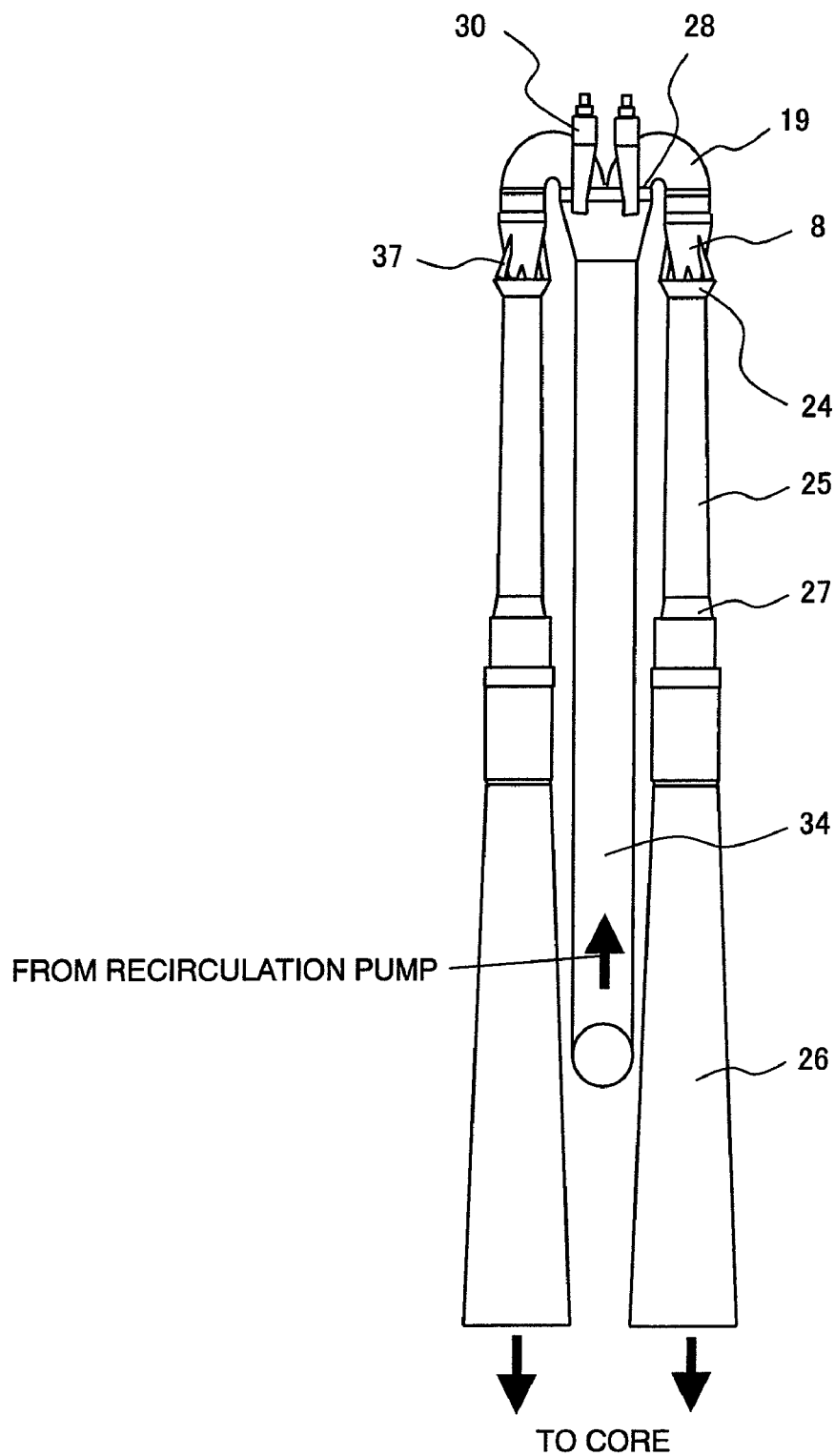
FIG. 4 is a side view showing the jet pump of the first embodiment.

A jet pump according to first embodiment is described the first embodiment which is a preferred embodiment of the present invention below. Before the structure of the jet pump in the present embodiment is explained, a general structure of a boiling water reactor (BWR) is described below using FIGS. 3 and 4.

A boiling water reactor (BWR) 1 has a reactor pressure vessel (hereinafter, referred to as a RPV) 2 and a core 3 disposed in the RPV 2. A plurality of fuel assemblies (not shown) are loaded in the core 3. A core shroud 4 disposed in the RPV 2 surrounds the core 3. A separator 5 and a dryer 6 are disposed above the core 3 in the RPV 2. A plurality of jet pumps 7 are disposed in a downcomer 31 which is an annular passage formed between the RPV 2 and the core shroud 4. The RPV 2 is provided with a recirculation system. This recirculation system has a recirculation pipe 32 and a recirculation pump 33. The recirculation pipe 32 is provided with the recirculation pump 33. One end of the recirculation pipe 32 is connected to the RPV 2, connecting with the downcomer 31. The other end of recirculation pipe 32 reaches in the RPV 2 and connects to a raiser pipe 34 (see FIG. 4) disposed in the downcomer 31. A feed water pipe 36 and a main steam pipe 35 are connected to the RPV 2.

The jet pump 7 has a nozzle apparatus 8, an inverted U-shaped elbow pipe (a second pipe member) 19, a bell mouth 24, a throat 25 and a diffuser 26. The diffuser 26 is disposed to a dividing member installed to the core shroud 4. The throat 25 is joined to an upper end portion of the diffuser 26 by a joint 27. The bell mouth 24 is installed on the upper end of the throat 25. The nozzle apparatus 8 is disposed above the bell mouth 24, and is fixed to the bell mouth 24 with a plurality of support plates 37. An outside cooling water suction passage 38 is formed between the nozzle apparatus 8 and the bell mouth 24. One end of the elbow pipe 19 is fixed to the upper end of the nozzle apparatus 8. Two jet pumps 7 are disposed on both sides of the single raiser pipe 34. Each nozzle apparatus 8 of the jet pumps 7 is connected to the single raiser pipe 34 through the individual elbow pipe 19.

Cooling water (suction fluid, coolant) present in the upper part in the RPV 2 is mixed with feed water supplied to the RPV 2 from the feed water pipe 36 and goes down in the downcomer 31. This cooling water flows into the recirculation pipe 32 by operation of the recirculation pump 33, and pressurized by the recirculation pump 33. This pressurized cooling water is called a driving flow (driving fluid) for convenience. This driving flow flows into the elbow pipe 19 of the jet pump 7 through the recirculation pipe 32 and the raiser pipe 34, and after the flow direction is changed 180° by the elbow pipe 19, ejects from the nozzle apparatus 8. Cooling water present around the nozzle apparatus 8 is sucked into the bell mouth 24 through the outside cooling water suction passage 38 by the ejection of the driving flow, and further sucked into the throat 25. This cooling water, with the driving flow, goes down in the throat 25 and the diffuser 26, and is discharged from the diffuser 26. The discharged cooling water (including the driving flow) is supplied to the core 3 via a lower plenum 39. The cooling water is heated when passing the core 3, and becomes a two-phase flow including water and steam. The separator 5 separates the steam and the water discharged from the core 3. Moisture in the separated steam is further eliminated by the dryer 6, and the steam is discharged to the main steam pipe 35. This steam is introduced to a steam turbine (not shown) and turns the steam turbine. The steam discharged from the steam turbine becomes water through condensation in a condenser (not shown). This water is supplied into the RPV 2 through the feed water pipe 36 as feed water. The water separated by the separator 5 and the dryer 6 goes down the downcomer 31.

The jet pump 7 effectively sucks the cooling water around the nozzle apparatus 8 by using the driving force of the driving flow discharged from the recirculation pump 33, and increases the flow rate of the cooling water discharged from the jet pump 7 more than the flow rate of the driving flow. The effective use of the kinetic energy of the driving flow generated by the recirculation pump 33 increases the rate of the cooling water discharged from the jet pump 7. The flow speed of the driving flow at the outlet of the nozzle apparatus 8 is increased to increase the kinetic energy of the driving flow, and at the same time, the passage area of the throat 25 is made smaller than that of the bell mouth 24 to increase the speed of the cooling water, so that static pressure can be reduced. From these, the cooling water can be sucked in the throat 25, and a required core flow rate can be obtained with little power.

In the jet pump 7, in order to increase the M ratio and the N ratio and to further improve the efficiency η, it is important to minimize pressure loss and to optimize suction power induced by the driving flow. Thus, in the jet pump 7 in the present embodiment, an inner cooling water suction passage 17 which runs through the nozzle apparatus 8 in the axial direction, is formed inside the nozzle apparatus 8, forming an opening portion 18 connecting with the downcomer 31, at the upper end. In addition, in the jet pump 7, the inner cooling water suction passage 17 extends upward inside the elbow pipe 19, and the opening portion 18 is formed on the outer surface of the elbow pipe 19 at a lower position than a top point TP of the elbow pipe 19.

Figure 1:
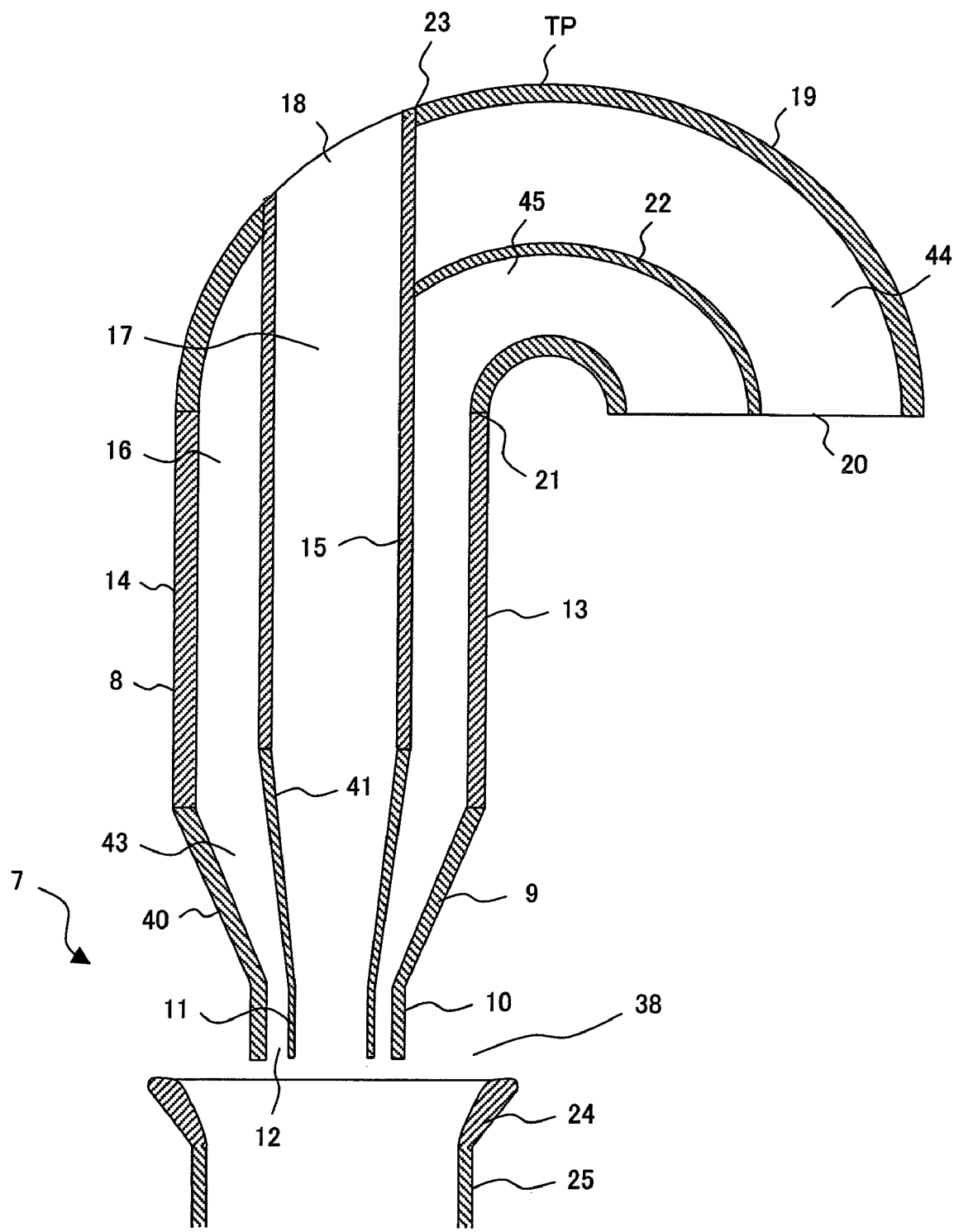
FIG. 1 is a longitudinal sectional view showing vicinity of a nozzle apparatus of the jet pump according to first embodiment applied to a BWR, which is a preferred embodiment of the present invention.
Figure 2:
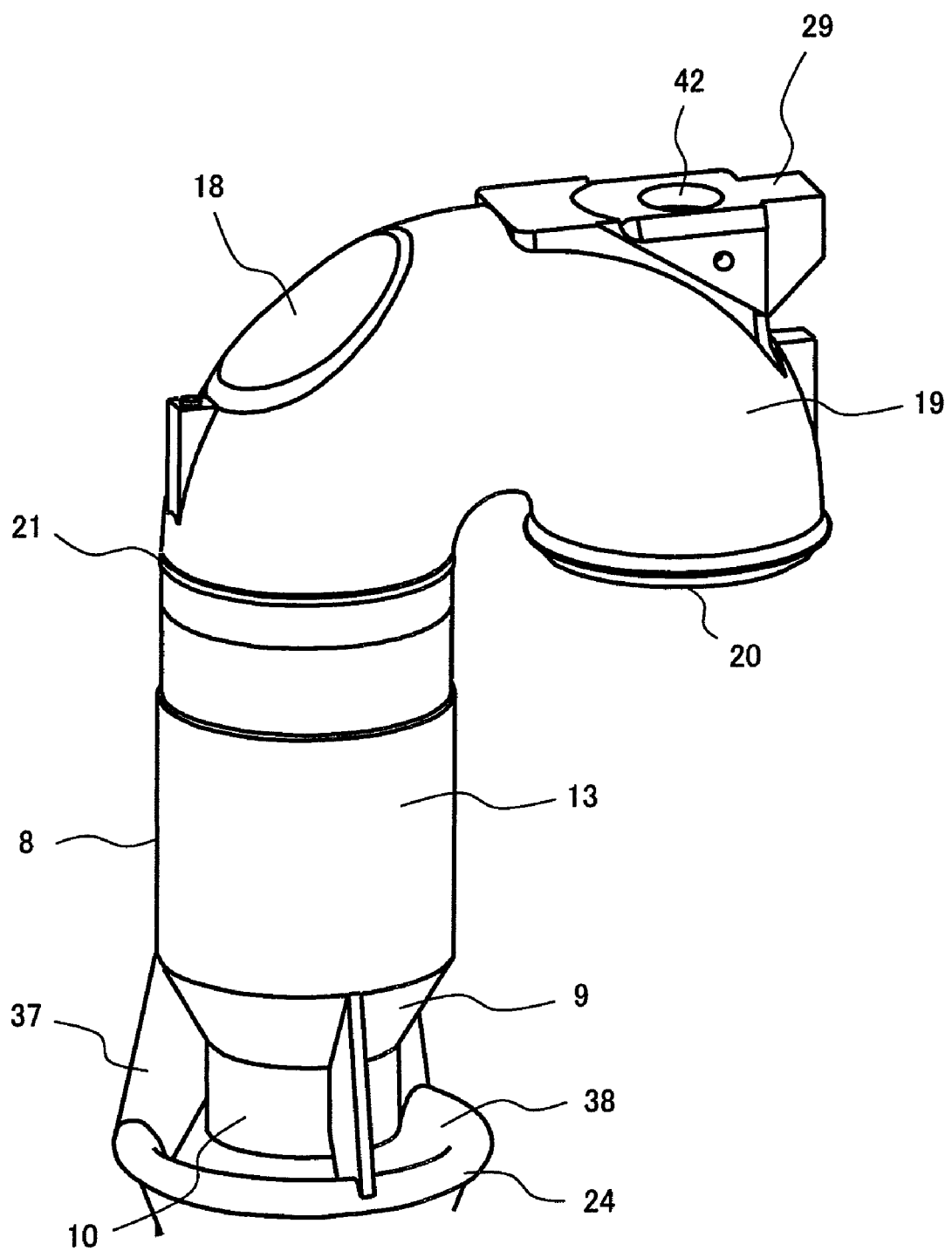
FIG. 2 is a perspective view showing the nozzle apparatus shown in FIG. 1.

A detailed structure of vicinity of the nozzle apparatus 8 in the jet pump 7 according to the present embodiment is explained using FIGS. 1 and 2. The jet pump 7, as described above, has the nozzle apparatus 8, the elbow pipe (the second pipe member) 19, the bell mouth 24, the throat 25 and the diffuser 26. The bell mouth 24, the throat 25 and the diffuser 26 are referred to as a jet pump body. The throat 25 has the smallest passage cross section in the jet pump body. The passage cross section of the bell mouth 24 expands upward from the connection portion with the throat 25. The passage cross section of the diffuser 26 gradually expands downward from the connection portion with the throat 25.

The nozzle apparatus 8, as shown in FIG. 1, has a nozzle portion 9 and a nozzle header portion 13. The nozzle header portion 13 has an outer cylinder member 14 and an inner cylinder member 15 disposed inside the outer cylinder member 14. An annular header portion 16 is formed between the outer cylinder member 14 and the inner cylinder member 15, which are concentrically disposed. The nozzle portion 9 is disposed below the nozzle header portion 13 and fixed to the lower end portion of the nozzle header portion 13.

The nozzle portion 9 has an outer cylinder member 10, an inner cylinder member 11, an outer funnel portion 40, and an inner funnel portion 41. The outer cylinder member 10 surrounds the inner cylinder member 11, and the outer cylinder member 10 and the inner cylinder member 11 are concentrically disposed. The outer funnel portion 40 surrounds the inner funnel portion 41, and the outer funnel portion 40 and the inner funnel portion 41 are concentrically disposed. Each cross section of the outer funnel portion 40 and the inner funnel portion 41 diminishes downward. The outer funnel portion 40 is fixed to the upper end of the outer cylinder member 10, and the inner funnel portion 41 is fixed to the upper end of the inner cylinder member 11. The outer funnel portion 40 is disposed to the lower end of the outer cylinder member 14. The inner funnel portion 41 is disposed to the lower end of the inner cylinder member 15. An annular ejection outlet 12 is formed between the outer cylinder member 10 and the inner cylinder member 11.

An outlet end 21 of the elbow pipe 19 is fixed to the nozzle header portion 13, that is, the upper end of the outer cylinder member 14. An inlet end 20 of the elbow pipe 19 is disposed to the upper end of the raiser pipe 34. The elbow pipe 19 is provided with a fixing pedestal 29 having a through-hole 42. The elbow pipe 19 is detachably coupled with the raiser pipe 34 by a fixture 30. The center of the outlet end 21 of the elbow pipe 19 matches the axis of the nozzle header portion 13, or the outer cylinder member 14. The nozzle portion 9, the nozzle header portion 13, and the elbow pipe 19 are joined into a single unit by welding.

The inner cylinder member 15 is inserted in the elbow pipe 19 from the outlet end 21 and extends upward. An opening portion 18 located at an upper end portion of the inner cylinder member 15 is formed on the outer surface of the elbow pipe 19 and connecting with the downcomer 31. The upper end of the inner cylinder member 15 is welded to the elbow pipe 19. A joint portion (fixed portion) 23 being at the highest point in the joint portion (fixed portion) of the inner cylinder member 15 to the elbow pipe 19 is disposed lower than the top point TP which is the highest point on the outer surface of the elbow pipe 19. A flow-adjusting plate (flow-adjusting member) 22 having the same curvature as the elbow pipe 19 is installed inside the elbow pipe 19, and disposed from the inlet end 20 of the elbow pipe 19 toward the inner cylinder member 15 along the axis of the elbow pipe 19. The flow-adjusting plate 22 is disposed to the upper course of the inner cylinder member 15. An upper passage 44 and a lower passage 45 are formed in the elbow pipe 19 by the installation of the flow-adjusting plate 22, which passages are separated into the top and bottom. Since the joint portion 23 is located lower than the top point TP, the upper passage 44 and the lower passage 45 in the elbow pipe 19 toward the outlet end 21 are formed diagonal to the axis of the inner cylinder member 15. In other words, the upper passage 44 and the lower passage 45 are formed so that the driving flow in the passages flows toward the outlet end 21, hitting the inner cylinder member 15 diagonally to the axial direction of the inner cylinder member 15.

The inner cooling water suction passage 17 connecting with the downcomer 31 through the opening portion 18 is formed inside of the inner cylinder member 15, the inner funnel portion 41 and the inner cylinder member 11 all joined together. The joined inner cylinder member 15, the inner funnel portion 41 and the inner cylinder member 11 are first pipe members. The passage cross section of the inner cooling water suction passage 17 gradually diminishes downward in the inner funnel portion 41, and the lower end of the inner cooling water suction passage 17 opens toward the bell mouth 24. An annular passage 43 formed between the outer funnel portion 40 and the inner funnel portion 41 connects between the annular header portion 16 and the annular ejection outlet 12, and the passage cross section of the annular passage 43 gradually diminishes downward.

A driving flow pressurized by the recirculation pump 33, that reaches the raiser pipe 34 is introduced into the annular header portion 16 through the elbow pipe 19. Since the flow-adjusting plate 22 is disposed in the elbow pipe 19, pressure loss in the elbow pipe 19 is reduced. In the elbow pipe 19, a part of the driving flow inside each of the upper passage 44 and the lower passage 45 flows toward the outlet end 21 hitting the outer surface of the inner cylinder member 15 diagonally to the axial direction of the first pipe member (especially the inner cylinder member 15). The driving flow introduced into the annular header portion 16 passes through the annular passage 43 and is ejected at a high speed toward the bell mouth 24 from the annular ejection outlet 12. The cross section of the driving flow ejected from the annular ejection outlet 12 is annular. Supplying the driving flow into the throat 25 at high speed reduces static pressure in the throat 25, and cooling water present around the nozzle apparatus 8 in the downcomer 31 is sucked into the bell mouth 24.

There are two patterns for sucking the cooling water, which is the suction flow, present around the nozzle apparatus 8 into the bell mouth 24 due to the reduction of the static pressure in the throat 25. The first pattern is that the cooling water present above the elbow pipe 19 introduces into the inner cooling water suction passage 17 from the opening portion 18, and reaches the bell mouth 24 through the inner cooling water suction passage 17. In this pattern, the cooling water sucked into the inner cooling water suction passage 17 flows inside of the ejected annular flow. The second pattern is that the cooling water in the downcomer 31 reaches the bell mouth 24 through the outside cooling water suction passage 38 outside of the ejected annular flow.

The driving flow ejected from the annular ejection outlet 12 and the cooling water (suction flow) sucked into the bell mouth 24 due to the effect of the driving flow are mixed in the throat 25 while exchanging their momentum, and introduced to the diffuser 26 placed below the throat 25. In the diffuser 26, the passage cross section gradually expands so that the flow of the cooling water (including the driving flow) would not be separated, and its kinetic energy is converted to pressure. In the diffuser 26, the pressure of the cooling water will be higher than the pressure at the position where the cooling water is sucked into the bell mouth 24. The cooling water with the increased pressure is discharged from the diffuser 26 and introduced to the core 3.

In the present embodiment, since the joint portion 23 is positioned lower than the top point TP, the upper passage 44 and the lower passage 45 in the elbow pipe 19 are formed toward the outlet end 21, diagonally to the inner cylinder member 15 forming the inner cooling water suction passage 17 in the axial direction of the inner cylinder member 15. From this, pressure loss is reduced in the elbow pipe 19 where the inner cylinder member 15 exists, and the flow speed of the cooling water ejected from the annular ejection outlet 12 is increased. The reduction range of the static pressure in the throat 25 becomes larger, and the flow rate of the cooling water sucked into the bell mouth 24 through the inner cooling water suction passage 17 and the outside cooling water suction passage 38 is increased. This increase in the flow rate of the cooling water improves efficiency for the jet pump 7.

Figure 5:
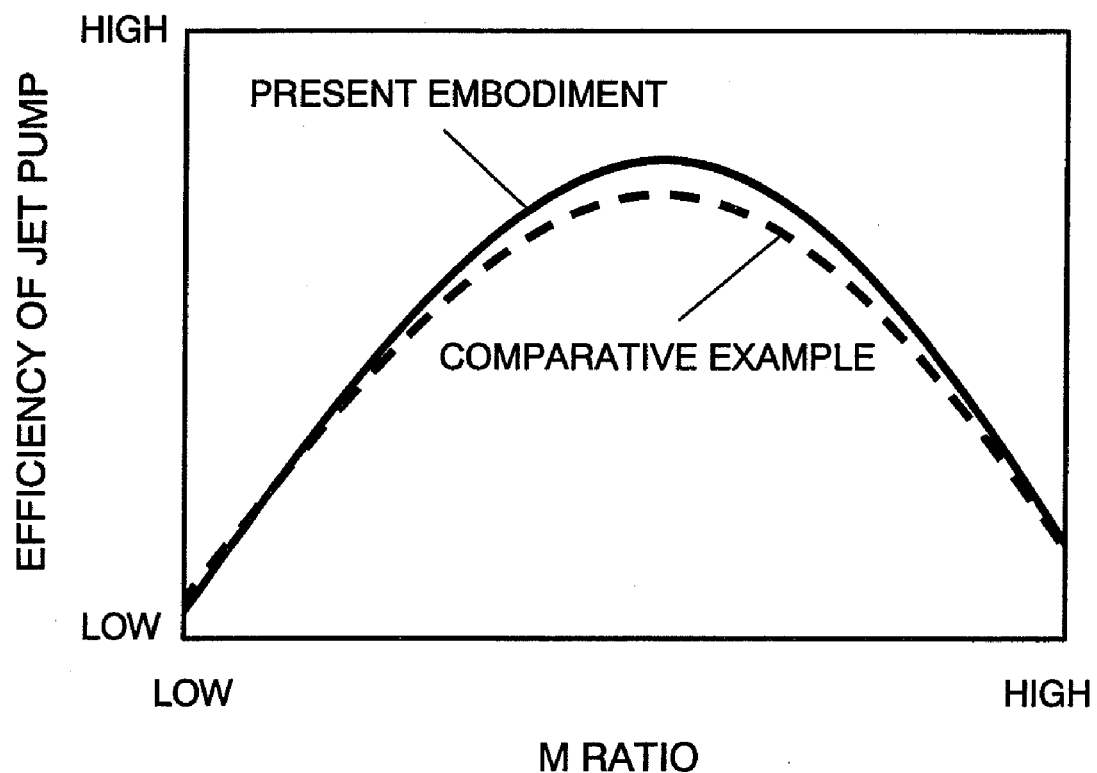
FIG. 5 is an explanatory diagram showing properties of the jet pump according to first embodiment and a jet pump of a comparative example.

This efficiency improvement of the jet pump 7 is specifically explained using FIG. 5. FIG. 5 shows a relationship between the M ratio and the efficiency of the jet pump for the jet pump in the present embodiment and the jet pump of a comparative example. In FIG. 5, the solid line shows the properties of the jet pump 7 in the present embodiment, and the broken line shows the properties of the jet pump of the comparative example. The jet pump of the comparative example uses the nozzle apparatus shown in FIG. 3 of Japanese Patent Laid-open No. 2001-90700 as a nozzle for the jet pump disclosed in U.S. Pat. No. 3,625,820 for a BWR. While the pressurized driving flow hits the inner cylinder of the nozzle apparatus at a right angle in the comparative example, in the jet pump 7, the driving flow flowing through the cooling water passage in the elbow pipe 19 hits the inner cylinder member 15 diagonally as described above. Because of such difference in the driving flows, the pressure loss in the jet pump 7 is less than that of the comparative example, which makes the efficiency of the jet pump 7 more than that of the comparative example.

In the present embodiment, since the flow-adjusting plate 22 is disposed in the elbow pipe 19, the pressure loss in the elbow pipe 19 is further reduced. Because of this reduction in the pressure loss, the efficiency of the jet pump 7 is further increased. Since the flow-adjusting plate 22 is disposed to the upper course of the inner cylinder member 15, separation and uneven speed distribution of the flow in the elbow pipe 19 are improved, and the pressure loss in the elbow pipe 19 is reduced.

Since the cooling water passages (the upper passage 44 and the lower passage 45) formed in the elbow pipe 19 are diagonal to the inner cylinder member 15 as described above, the driving flow flowing in the cooling water passages hits the outer surface of the inner cylinder member 15 diagonally to the axial direction of the inner cylinder member 15. This causes the stress generated at the contact portion between the inner cylinder member 15 and the elbow pipe 19 to be small. Thus, when the nozzle apparatus 8 is applied to a current BWR, it is not necessary to reinforce the joint portion by making the member particularly thick, or to modify the raiser pipe 34 and the fixture 30.

In the present embodiment, since the inner cooling water suction passage 17 is formed in the nozzle apparatus 8, the effect of the pressure reduction in the area inside the ejected annular flow can be effectively used. From this, the flow of the cooling water reaching the bell mouth 24 through the inner cooling water suction passage 17 can be generated. Thus, the flow rate of the cooling water flowing into the bell mouth 24 is increased since the cooling water can flow into the bell mouth 24 through each of the inner cooling water suction passage 17 and the outside cooling water suction passage 38.

Since the inner cooling water suction passage 17 is disposed in the axial direction of the RPV 2 and the opening portion 18 opens upward, the flow power of the cooling water moving down in the downcomer 31, supplied to the inner cooling water suction passage 17, can be effectively used to increase the suction power of the jet pump 20. From this, the rate of the cooling water sucked into the throat 25 can be increased. In addition, since the outer funnel portion 40, the outer diameter of which diminishes downward, is used in the nozzle portion 9, the nozzle apparatus 8 has a structure which allows the cooling water moving down in the downcomer 31 to be easily sucked into the bell mouth 24 through the outside cooling water suction passage 38. From this also, the flow rate of the cooling water flowing into the bell mouth 24 can be increased, thus the efficiency of the jet pump 7 can be increased.

In a BWR, the flow rate of the cooling water to be supplied to the core 3 (core flow rate) is adjusted by controlling the rotation speed of the recirculation pump 33. By improving the M ratio and the efficiency of the jet pump, the core flow rate can be increased with less recirculation pump power. Thus, the power consumption required for operation of the recirculation pump 12 can be reduced. In addition, when a power uprate of a nuclear reactor implemented in the U.S. is to be implemented, the core flow rate can be further increased without increasing the capacity of the recirculation pump 33 by using the jet pump 7 in the present embodiment to the current nuclear reactor, which jet pump 7 increases the M ratio and the efficiency of the jet pump. For this reason, the power uprate can be easily handled by merely replacing the nozzle of each jet pump in the current nuclear reactor to the nozzle apparatus 8.

Furthermore in the present embodiment, since the inverted U-shaped elbow pipe 19 is connected to the nozzle apparatus 8, each elbow pipe 19 connected to each nozzle apparatus 8 of two jet pumps 7 can be connected to the single raiser pipe 34 disposed in the downcomer 31, adjacent to the two jet pumps 7. Because of this, the space between the jet pumps 7 can be made equal to that of the current BWR.

Second Embodiment

Figure 6:
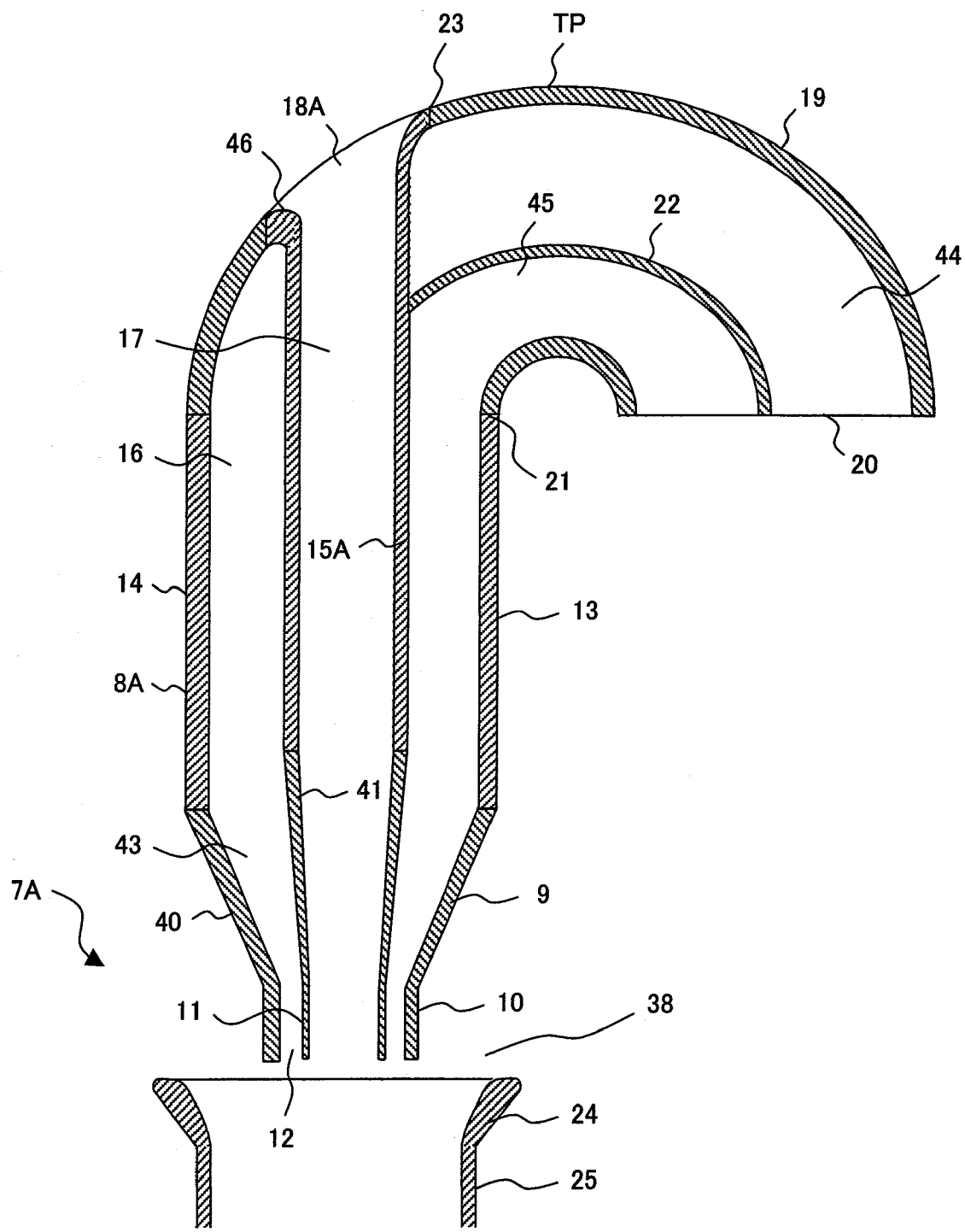
FIG. 6 is a longitudinal sectional view showing vicinity of a nozzle apparatus of the jet pump according to second embodiment applied to a BWR, which is another embodiment of the present invention.

A jet pump according to second embodiment, which is another embodiment of the present invention is explained using FIG. 6. A jet pump 7A in the present embodiment has a nozzle apparatus 8A replacing the nozzle apparatus 8 of the jet pump 7 in the first embodiment. The other structure of the jet pump 7A is the same as the jet pump 7. The jet pump 7A is disposed in the downcomer 31 in the RPV 2 of a BWR also. The nozzle apparatus 8A has an inner cylinder member 15A replacing the inner cylinder member 15 of the nozzle apparatus 8, having a curved surface 46 on the inner surface of the upper end portion. The other structure of the nozzle apparatus 8A is the same as the nozzle apparatus 8. Because such inner cylinder member 15A is provided, the passage cross section of an opening portion 18A gradually diminishes downward due to the formation of the curved surface 46. The opening portion 18A is formed at the upper end portion of the inner cooling water suction passage 17 formed in the connected inner cylinder member 15A, the inner funnel portion 41, and the inner cylinder member 11.

The inlet end 20 of the elbow pipe 19 is connected to the raiser pipe 34 using the fixture 30 in the same manner as the first embodiment. The flow-adjusting plate 22 is disposed in the elbow pipe 19. The outlet end 21 of the elbow pipe 19 is fixed to the upper end of the outer cylinder member 14 of the nozzle header portion 13 by welding. In the jet pump 7A in the present embodiment also, the joint portion 23 which is at the highest position in the joint portion between the inner cylinder member 15A and the elbow pipe 19, is located lower than the top point TP on the outer surface of the elbow pipe 19. Thus, the cooling water passages (the upper passage 44 and the lower passage 45) formed in the elbow pipe 19 are formed in such a way that the driving flow flowing toward the outlet end 21 hits the inner cylinder member 15A diagonally to the axial direction of the inner cylinder member 15A in the elbow pipe 19. In such jet pump 7A in the present embodiment also, the pressure loss in the elbow pipe 19 is reduced and efficiency of the jet pump is increased in the same manner as the jet pump 7. Since the jet pump 7A has the flow-adjusting plate 22, the efficiency of the jet pump is further increased.

In the present embodiment in which the curved surface 46 is formed at the opening portion 18A of the inner cooling water suction passage 17, the following effects can occur. The cooling water sucked into the bell mouth 24 from the inner cooling water suction passage 17 is sucked in the inner cooling water suction passage 17 from a wider range than the opening size of the opening portion 18A. When the edge angle of the upper end of the inner cylinder member 15A is sharp, pressure loss will occur due to the abrupt change in the flow direction of the sucked cooling water; and in addition, the pressure loss may be further increased by possible flow separation. By forming the curved surface 46 on the inner surface of the upper end portion of the inner cylinder member 15A, the change in the flow direction of the sucked cooling water will be smooth as well as preventing flow separation, and thus, the pressure loss can be reduced.

The larger the passage cross section of the opening portion 18A sucking the cooling water, the easier for the cooling water to be sucked into the inner cooling water suction passage 17. On the other hand, the smaller the outer diameter of the inner cylinder member 15A is, the larger the passage cross section of the annular header portion 16 formed in the nozzle header portion 13 will be. Since the flowing speed of the driving flow flowing in the annular header portion 16 can be reduced, the pressure loss in the nozzle header portion 13 can be decreased. Since the curved surface 46 is formed at the opening portion 18A of the inner cooling water suction passage 17, the passage cross section of the opening portion 18A can become larger and the outer diameter of the inner cylinder member 15A can become smaller. As discussed above, the reduction of passage drag at the opening portion 18A of the inner cooling water suction passage 17 and the reduction of the pressure loss inside the nozzle apparatus 8A can further improve the efficiency of the jet pump.

Third Embodiment

Figure 7:
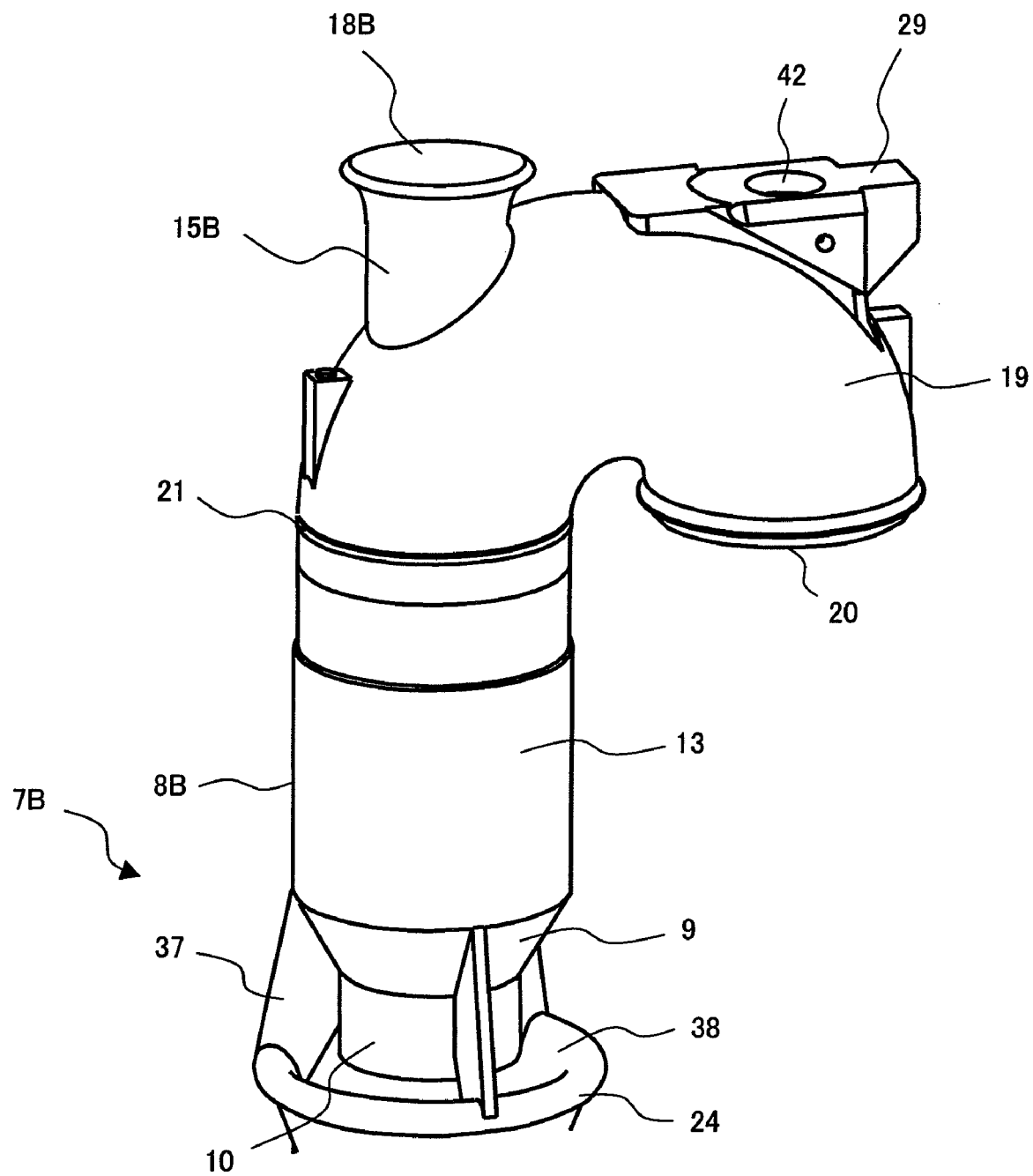
FIG. 7 is a perspective view showing vicinity of a nozzle apparatus of a jet pump according to third embodiment applied to a BWR, which is another embodiment of the present invention.
Figure 8:
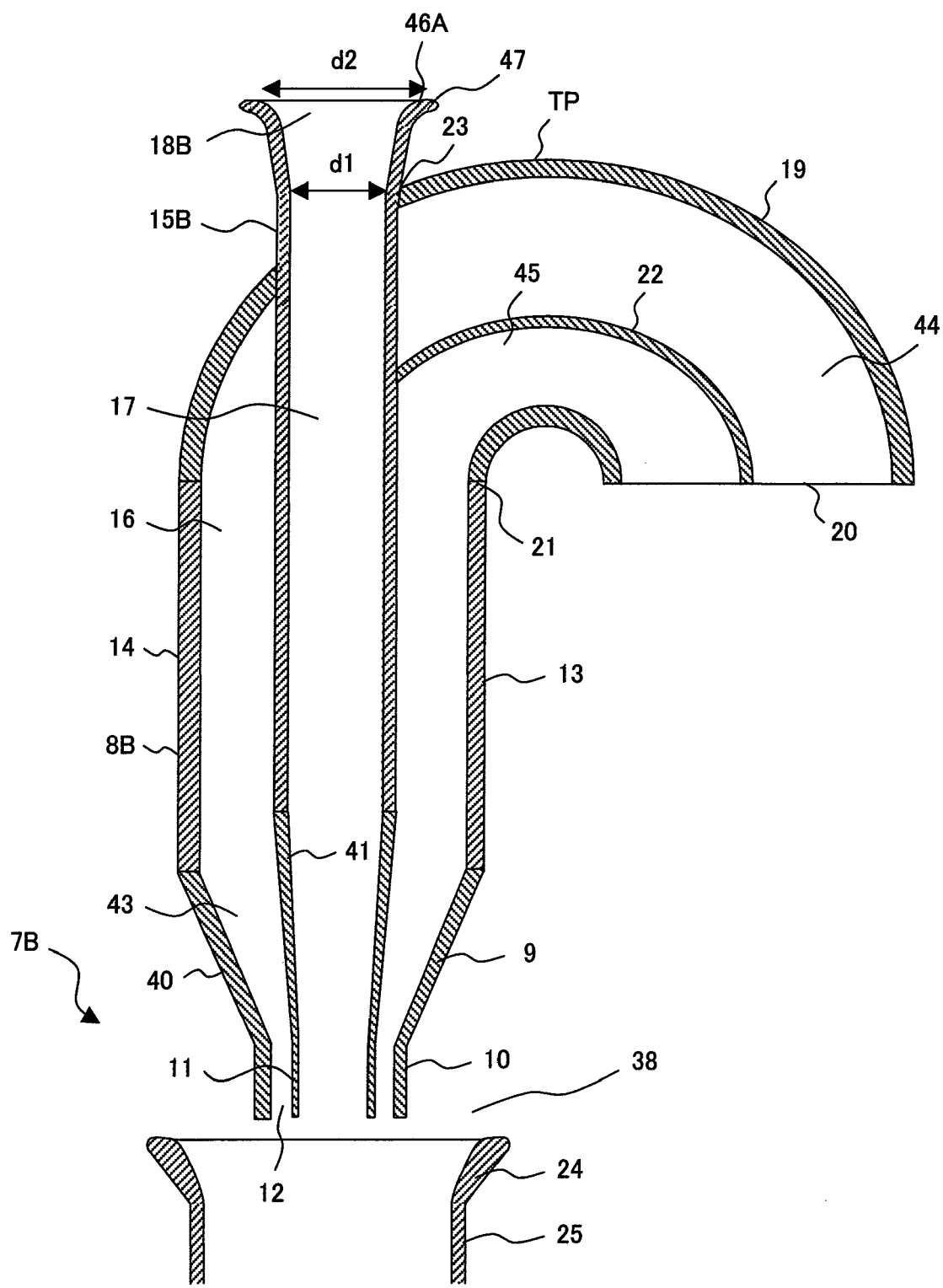
FIG. 8 is a longitudinal sectional view sowing vicinity of the nozzle apparatus shown in FIG. 7.

A jet pump according to third embodiment which is another embodiment of the present invention is explained using FIGS. 7 and 8. A jet pump 7B of the present embodiment has a nozzle apparatus 8B replacing the nozzle apparatus 8 of the jet pump 7 in the first embodiment. The other structure of the jet pump 7B is the same as the jet pump 7. The jet pump 7B is disposed in the downcomer 31 in the RPV 2 of a BWR also. An inner cylinder member 15B provided to the nozzle apparatus 8B is longer than the inner cylinder member 15 provided to the nozzle apparatus 8 in the first embodiment. A protruding portion 47 is formed at the upper end portion of the inner cylinder member 15B. Since the inner cylinder member 15B is long, when the outlet end 21 of the elbow pipe 19 is welded to the upper end of the outer cylinder member 14, the protruding portion 47 protrudes upward from the outer surface of the elbow pipe 19. The joint portion 23 located at the highest position in the joint portion between the inner cylinder member 15B and the elbow pipe 19 is positioned lower than the top point TP on the outer surface of the elbow pipe 19. A curved surface 46A is formed on the inner surface of the upper end portion of the protruding portion 47. An opening portion 18B formed at the upper end portion of the inner cooling water suction passage 17 formed inside the connected inner cylinder member 15B, the inner funnel portion 41 and the inner cylinder member 11 is formed in the protruding portion 47. The cross section of the opening portion 18B gradually diminishes downward due to the formation of the curved surface 46A.

The jet pump 7B in the present embodiment can also obtain the effects generated by the jet pump 7 in the first embodiment. In the present embodiment, since the inner cooling water suction passage 17 protrudes upward from the outer surface of the elbow pipe 19, the inner diameter of the opening portion 18B of the inner cooling water suction passage 17 can be made larger without being limited by the elbow pipe 19. Although the inner diameter of the opening portion 18B is large, the passage cross section of the protruding portion 47 can be moderately made smaller. Because of this, the outer diameter of the lower part of the inner cylinder member 15B below the protruding portion 47 can be made smaller. In the present embodiment, an inner diameter d2 at the upper end of the opening portion 18A is larger than an inner diameter d1 of the protruding portion 47 at the lower end of the protruding portion 47 (fixing position of the inner cylinder member 15B to the elbow pipe 19). Thus, drag in the inner cooling water suction passage 17 is reduced. From above, pressure loss in the annular header portion 16 can be reduced while increasing the suction rate of the cooling water into the inner cooling water suction passage 17. The present embodiment can improve efficiency of the jet pump.

In the present embodiment, the effects generated in the first embodiment can be obtained.

In the first embodiment and second embodiment, each upper end of the opening portions 18 and 18A are tilted, so the shape of each upper end of these openings is oval. However, in the third embodiment, the shape of the opening portion 18B is circular. Because of this, the inner cooling water suction passage 17 can evenly suck the cooling water in the circumferential direction of the passage. In the present embodiment such as this, the pressure loss at the time of the cooling water being sucked into the inner cooling water suction passage 17 can be further reduced, and the efficiency of the jet pump can be further improved.

What is claimed is:

1. A jet pump comprising:
a nozzle apparatus extending in an axial direction including a header portion, a first pipe member extending in the axial direction of the nozzle apparatus so that the first pipe member extends in the axial direction and forming a first suction liquid passage for introducing suction liquid, the header portion surrounding the first pipe member for introducing a driving liquid, and a nozzle portion connected to the header portion, the nozzle portion surrounding the first pipe member and forming an annular ejection outlet for ejecting the driving liquid from the header portion;
a jet pump body having a bell mouth disposed below the nozzle apparatus;
a second suction liquid passage formed between the nozzle apparatus and the bell mouth for introducing suction liquid
the jet pump body enabling mixing of the driving liquid and the suction liquid sucked through the first and second suction liquid passages by the ejection of the driving liquid from the header portion and enabling discharging the mixed liquid from the jet pump body; and
a second pipe member having one end connected to the nozzle apparatus for introducing the driving liquid to the header portion;
wherein the first pipe member is disposed through the one end of the second pipe member and inside a driving liquid passage formed in the second pipe member and forms an opening portion of the first suction liquid passage opened to an outside of the second pipe member in the axial direction of the first pipe member, and an outlet of the first suction liquid passage formed by the first pipe member being in communication with the opening portion of the first pipe member in the axial direction of the first pipe member; and
wherein the driving liquid passage is formed so that the driving liquid flowing toward the one end of the second pipe member hits the first pipe member diagonally to the axial direction of the first pipe member in a straight pipe portion of the first pipe member.

2. The jet pump according to claim 1, wherein the first pipe member forms a curved surface curving toward the axial direction of the first pipe member, on an inside surface of the opening portion.

3. The jet pump according to claim 1, wherein the end portion of the first pipe member where the opening portion is formed protrudes outside of the second pipe member; and in the protruding portion of the first pipe member, the diameter of an end of the suction liquid passage where the suction liquid is sucked is larger than the diameter of the suction liquid passage at the part where the first pipe member passes through the second pipe member.

4. The jet pump according to claim 1, wherein the second pipe member is curved in an inverted U-shape.

5. The jet pump according to claim 1, wherein a flow-adjusting member is disposed in the second pipe member along a center axis of the second pipe member.

6. The jet pump according to claim 5, wherein the flow-adjusting member is disposed to an upper course of the first pipe member.

7. The jet pump according to claim 1, wherein the first pipe member extends in an axial direction of the nozzle apparatus.

8. A jet pump comprising:
a nozzle apparatus extending in an axial direction including a header portion, a first pipe member extending in the axial direction so that the first pipe member extends in the axial direction and forming a first suction liquid passage for introducing suction liquid, the header portion surrounding the first pipe member for introducing a driving liquid, and a nozzle portion connected to the header portion, the nozzle portion surrounding the first pipe member and forming an annular ejection outlet for ejecting the driving liquid from the header portion;
a jet pump body having a bell mouth disposed below the nozzle apparatus;
a second suction liquid passage formed between the nozzle apparatus and the bell mouth for introducing suction liquid;
the jet pump body enabling mixing of the driving liquid and the suction liquid sucked through the first and second suction liquid passages by the ejection of the driving liquid from the header portion and enabling discharging the mixed liquid from the jet pump body; and
an inverted U-shaped second pipe member having one end connected to the nozzle apparatus for introducing the driving liquid to the header portion;
wherein the first pipe member extending in the axial direction extends in an axial direction of the nozzle apparatus and is disposed through the one end of the second pipe member inside a driving liquid passage formed in the second pipe member and forms an opening portion of the first suction liquid passage opened to an outside of the second pipe member in the axial direction of the first pipe member, and an outlet of the first suction liquid passage formed by the first pipe member being in communication with the opening portion of the first pipe member in the axial direction of the first pipe member;

wherein the driving liquid passage formed in the inverted U-shaped section second pipe member is formed so that the driving liquid flowing toward the one end of the second pipe member hits the first pipe member diagonally to the axial direction of the first pipe member in a straight pipe portion of the first pipe member; and a fixing position of the first pipe member to the second pipe member in the axial direction of the first pipe member is disposed lower than a top point of an outer surface of the inverted U-shape second pipe member.

9. The jet pump according to claim 8, wherein a flow-adjusting member is disposed in the second pipe member along a center axis of the second pipe member.

10. A nuclear reactor comprising:

a reactor vessel, a plurality of jet pumps disposed in the reactor vessel for supplying coolant to a core formed in the reactor vessel, and a raiser pipe disposed in the reactor vessel for introducing driving liquid;

wherein the jet pump comprises:

a nozzle apparatus extending in an axial direction including a header portion, a first pipe member extending in the axial direction of the nozzle apparatus so that the first pipe member extends in the axial direction and forming a first suction liquid passage for introducing suction liquid, the header portion surrounding the first pipe member for introducing driving liquid, and a nozzle portion connected to the header portion, the nozzle portion surrounding the first pipe member and forming an annular ejection outlet for ejecting the driving liquid from the header portion;

a jet pump body having a bell mouth disposed below the nozzle apparatus;

a second suction liquid passage formed between the nozzle apparatus and the bell mouth for introducing suction liquid;

the jet pump body enabling mixing of the driving liquid and the suction liquid sucked through the first and second suction liquid passages by the ejection of the driving liquid from the header portion and enabling discharging the mixed liquid from the jet pump body; and a second pipe member having one end connected to the nozzle apparatus for introducing the driving liquid to the header portion;

wherein the first pipe member is disposed through the one end of the second pipe member and inside a driving liquid passage formed in the second pipe member and forms an opening portion of the first suction liquid passage opened to an outside of the second pipe member in the axial direction of the first pipe member, and an outlet of the first suction liquid passage formed by the first pipe member being in communication with the opening portion of the first pipe member in the axial direction of the first pipe member;

wherein the driving liquid passage is formed so that the driving liquid flowing toward the one end of the second pipe member hits the first pipe member diagonally to the axial direction of the first pipe member in a straight pipe portion of the first pipe member; and wherein the second pipe member is connected to an upper end portion of the raiser pipe.

11. The nuclear reactor according to claim 10, wherein the plurality of jet pumps include two jet pumps, the second pipe member of each of the two jet pumps is connected to the raiser pipe which is disposed adjacent to the two jet pumps, the raiser pipe being a single raiser pipe.

12. The jet pump according to claim 1, wherein the jet pump body further includes a throat and a diffuser extending in the axial direction of the nozzle apparatus.

13. The jet pump according to claim 8, wherein the jet pump body further includes a throat and a diffuser extending in the axial direction of the nozzle apparatus.

14. The nuclear reactor according to claim 10, wherein the jet pump body further includes a throat and a diffuser extending in the axial direction of the nozzle apparatus.

* * * * *